(12) United States Patent
Woodward

(10) Patent No.: US 10,011,070 B2
(45) Date of Patent: Jul. 3, 2018

(54) PROCESS FOR PRODUCING FORMED THERMOPLASTIC

(75) Inventor: Adrian Michael Woodward, Bury St Edmonds (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 913 days.

(21) Appl. No.: 14/113,400

(22) PCT Filed: Apr. 11, 2012

(86) PCT No.: PCT/EP2012/056529
§ 371 (c)(1),
(2), (4) Date: Oct. 23, 2013

(87) PCT Pub. No.: WO2012/150109
PCT Pub. Date: Nov. 8, 2012

(65) Prior Publication Data
US 2014/0048979 A1   Feb. 20, 2014

(30) Foreign Application Priority Data
May 3, 2011   (EP) ..................................... 11164540

(51) Int. Cl.
*B29C 61/02* (2006.01)
*B65B 29/02* (2006.01)
(Continued)

(52) U.S. Cl.
CPC .......... *B29C 61/025* (2013.01); *B29C 51/004* (2013.01); *B29C 51/08* (2013.01);
(Continued)

(58) Field of Classification Search
CPC ............................ B29C 61/02; B29C 61/025
(Continued)

(56) References Cited

U.S. PATENT DOCUMENTS 3,239,586 A * 3/1966 Adams ................... A41C 5/005
264/123
3,487,139 A * 12/1969 Ayala .................... B29C 43/361
264/132
(Continued)

FOREIGN PATENT DOCUMENTS

CN  101870378  10/2010
CN  101910261  12/2010
(Continued)

OTHER PUBLICATIONS

IPRP1 in PCTEP2012056529, dated Nov. 5, 2013.
(Continued)

*Primary Examiner* — Atul P. Khare
(74) *Attorney, Agent, or Firm* — Foley & Lardner LLP

(57) ABSTRACT

A process for forming a sheet of thermoplastic material into a three-dimensional shape comprising at least one vertex, the process comprising the steps of (i) forming the sheet by means of a former having a profile such as to produce a first formed shape in the sheet, followed by (ii) positioning a male former within the first formed shape, the male former having a profile within the first formed shape comprising at least one vertex and (iii) raising the temperature of the first formed shape above that of forming in step (i), thereby causing the first formed shape to shrink back towards its original sheet form and thereby adopting the profile of the male former.

14 Claims, 3 Drawing Sheets

(51) Int. Cl.
  *B29C 51/00* (2006.01)
  *B29C 51/08* (2006.01)
  *B29C 69/02* (2006.01)
  *B29K 67/00* (2006.01)
  *B29L 31/00* (2006.01)

(52) U.S. Cl.
  CPC ............ *B29C 51/082* (2013.01); *B29C 61/02* (2013.01); *B29C 69/025* (2013.01); *B65B 29/02* (2013.01); *B65B 29/028* (2017.08); *B29K 2067/046* (2013.01); *B29K 2995/0065* (2013.01); *B29L 2031/712* (2013.01)

(58) Field of Classification Search
  USPC .................. 264/289.6, 342 R, 909, DIG. 71
  See application file for complete search history.

(56) References Cited

U.S. PATENT DOCUMENTS

| | | | | |
|---|---|---|---|---|
| 3,542,561 | A * | 11/1970 | Rambold | B65D 85/808 426/79 |
| 4,388,356 | A * | 6/1983 | Hrivnak | B29C 51/04 264/544 |
| 4,551,336 | A * | 11/1985 | Chen | B65D 85/808 206/0.5 |
| 4,555,378 | A * | 11/1985 | Martin | B29C 51/08 264/219 |
| 5,230,455 | A * | 7/1993 | Price | B01D 46/0001 226/88 |
| 5,246,474 | A * | 9/1993 | Greatorex | B01D 39/163 264/324 |
| 5,290,502 | A * | 3/1994 | Jeffery | B01D 39/163 210/507 |
| 5,456,836 | A * | 10/1995 | Jeffery | B01D 39/163 210/505 |
| 5,472,660 | A * | 12/1995 | Fortin | B29C 49/00 264/522 |
| 7,763,295 | B2 * | 7/2010 | Mayr | A47G 19/16 426/77 |
| 7,963,089 | B2 * | 6/2011 | Nelson | A61J 1/035 53/453 |
| 8,272,194 | B2 * | 9/2012 | Nelson | A61J 1/035 53/453 |
| 9,446,874 | B2 * | 9/2016 | Nelson | A61J 1/035 |
| 2003/0047565 | A1 | 3/2003 | Oda et al. | |
| 2003/0087015 | A1 * | 5/2003 | Wyslotsky | A23B 7/148 426/397 |
| 2010/0282682 | A1 * | 11/2010 | Eaton | B01D 39/04 210/650 |
| 2011/0052846 | A1 * | 3/2011 | Hikida | B65D 23/0878 428/34.9 |
| 2011/0151060 | A1 | 6/2011 | Nakagiri | |
| 2011/0172386 | A1 | 7/2011 | Kim et al. | |

FOREIGN PATENT DOCUMENTS

| | | | |
|---|---|---|---|
| DE | 1479082 | 4/1969 | |
| EP | 1825998 | 8/2007 | |
| FR | 2614576 A1 * | 11/1988 | ............ B29C 51/00 |
| FR | 2614576 A1 * | 11/1988 | ............ B29C 51/00 |
| GB | 1058924 | 2/1967 | |
| GB | 2408252 A * | 5/2005 | ............ B65B 9/042 |
| JP | 56-164817 | 12/1981 | |
| JP | 10-067045 A2 | 3/1998 | |
| JP | 2002292726 | 10/2002 | |
| JP | 2004223948 | 8/2004 | |
| JP | 2004223948 A * | 8/2004 | |
| JP | 20096135 | 1/2009 | |
| JP | 2009006135 A * | 1/2009 | |
| JP | 2010069281 | 4/2010 | |
| WO | WO9318907 | 9/1993 | |
| WO | WO9501907 | 1/1995 | |
| WO | WO2004033303 | 4/2004 | |
| WO | WO2009036422 | 3/2009 | |

OTHER PUBLICATIONS

Written Opinion in EP11164540, dated Sep. 28, 2011.
Written Opinion in PCTEP2012056529, dated Oct. 12, 2012.
European Search Report, EP 11 16 4540, completed Sep. 28, 2011, 2 pp.
International Search Report, PCT/EP2012/056529, dated Oct. 12, 2012, 3 pp.

* cited by examiner

PROCESS FOR PRODUCING FORMED THERMOPLASTIC

TECHNICAL FIELD OF THE INVENTION

The present invention relates to the manufacture of formed thermoplastic, in particular to form infusion packets such as tea bags having a pre-determined three-dimensional shape, and in particular, shapes having sharp features.

BACKGROUND TO THE INVENTION

For many years infusion packets, such as tea bags were available primarily as square or round two-ply sheets of porous filter material, typically made of paper, with the infusible material, such as tea, sandwiched between the sheets. Such packets restrict the flow of infusible material within the packet substantially to two dimensions. As a result the infusion performance of such packets is limited.

Thus the past few decades have seen the development of mass-produced infusion packets which have a more three-dimensional shape and which allow the infusible substance more room to move. Of particular success have been the tetrahedral-shaped packets such as those described in the international patent applications published as WO 95/01907 (Unilever) and WO 2004/033303 (I. M. A. SPA).

In the manufacture of tetrahedral packets, the tetrahedral shape is conventionally formed by making mutually perpendicular transverse seals in a tube of filter material and apparatus designed for such manufacture is ill-suited to the manufacture of other three-dimensional shapes.

Therefore, it would be desirable to develop a process which can manufacture a variety of three-dimensional shapes, particularly shapes comprising sharp features, typified by a vertex, e.g. as provided by a tetrahedral shape.

Definitions

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

SUMMARY OF THE INVENTION

The inventors have realised that known thermoforming processes, whilst capable of generating a variety of three-dimensional shapes, are not suitable for use with infusion packet material, particularly when the shapes comprise sharp features.

Firstly, infusion packets are most commonly made of paper, which is not thermoformable. Secondly, even if they were made from a thermoformable material, they would be inappropriate for thermoforming due to their porosity and thinness of the material.

Known thermoforming processes involve a first step of heating the material followed by a second step of thermoforming the material. The very small heat capacity of infusion packet material means that any heating will quickly be lost and so this approach will not work.

Even if a way of solving the heating problem could be found, substantial difficulties would remain. For example, known thermoforming techniques typically involve the use of air pressure to form the material. However, the porosity of infusion packet material makes this approach impractical, as any difference in air pressure across the material will quickly equalise.

If air pressure is not used, and a mould were pressed into the material then unacceptably high stresses would be induced in the material, particularly around any sharp features of the mould, causing failure of the material.

Thus, it would seem that thermoforming is not a practical method of generating three-dimensional shapes from infusion packet material comprises sharp features.

However, surprisingly the present inventors have overcome these barriers and developed a forming process that can produce three-dimensional shapes having sharp features which are capable of being formed from infusion packet material.

Accordingly, the invention relates to a process for forming a sheet of thermoplastic material into a three-dimensional shape comprising at least one vertex, the process comprising the steps of:
(i) forming the sheet by means of a former having a profile such as to produce a first formed shape in the sheet, followed by
(ii) positioning a male former within the first formed shape, the male former having a profile within the first formed shape comprising at least one vertex and
(iii) raising the temperature of the first formed shape above that of forming in step (i), thereby causing the first formed shape to shrink back towards its original sheet form and thereby adopting the profile of the male former.

The process thus involves forming the thermoplastic material into a first formed shape which is larger than the eventual formed shape. Furthermore the first formed shape contains no sharp features so that the stresses induced in the material during forming are evenly spread throughout the material. Once formed, the first formed shape is caused to shrink-back onto a male former having sharp features, thus generating a formed shape having sharp features.

The stresses induced around the sharp features, although not completely removed, are greatly less than those that would be encountered if the material were thermoformed directly by the male former having sharp features.

Thus, even very thin and porous material can be formed into three-dimensional shapes having sharp features, according to the process of the present invention.

Therefore, preferably the thermoplastic material has an average thickness of less than 1.0 mm, preferably less than 0.50 mm, more preferably less than 0.2 mm, most preferably from 0.01 to 0.1 mm.

Also, preferably the thermoplastic material is gas permeable. For example, it may comprise filaments of thermoplastic material in a fabric form.

The male former comprises a vertex in its profile, which is a point, peak or pinnacle formed by the confluence of one or more faces of the profile and is effectively zero dimensional in geometric terms. However it may be appreciated that in practice the vertex may extend over a small area, e.g. a millimeter or two, and may comprise a small degree of rounding. An edge, which extends over a length and is one dimensional and formed from the confluence of two sides, does not constitute a vertex.

The vertex may for example be the pinnacle of a conical form, where the vertex is formed by only one face or side. Equally the vertex could be the pinnacle of three or more sides, for example a corner of a cuboid or a pinnacle of a pyramidal profile.

The male former may comprise a plurality of vertices in its profile, according to whichever shape is desired.

The first step of forming the sheet of thermoplastic material may be carried out by any known forming process known in the art. However, preferably the first formed shape is formed by a male former, so that the first formed shape adopts the profile of the male former. However, any male former employed in the first step typically has a profile without any edges or vertices where it comes into contact with the thermoplastic material. As discussed above, this is to reduce stress in the material during initial forming.

The heat treatment step can be carried out in a wide variety of ways, however a preferred method of heating the thermoplastic material is to direct a heated gas stream onto the thermoplastic material. This is particularly effective if the material is porous and relatively thin, as the low heat capacity of the material results in a short heating time.

The temperature of the thermoplastic material in the third step is greater than that in the first forming step and is preferably greater than 100° C., more preferably greater than 120° C., most preferably from 130 to 200° C. As discussed above, this can be achieved at least by directing gas at a temperature in excess of these levels.

The thermoplastic material can be made form a wide variety of materials, however polyethylene terephthalate (PET) and poly lactic acid (PLA) are preferred.

The process according to the present invention is capable of generating three-dimensional shapes which can then be used as infusion packet material. For example, shapes such as tetrahedral, pyramidal, parallelepipeds, prisms, cones and the like are possible. However pyramidal and/or tetrahedral shapes are preferred.

Thus, the process is generally followed by the step of depositing a particulate product, typically comprising infusible entities such as tea leaves, into the formed thermoplastic material. This step is then typically followed by sealing the formed material to produce a sealed porous infusion packet.

The invention will now be illustrated by way of example and with reference to the following figures, in which.

Figure 1:
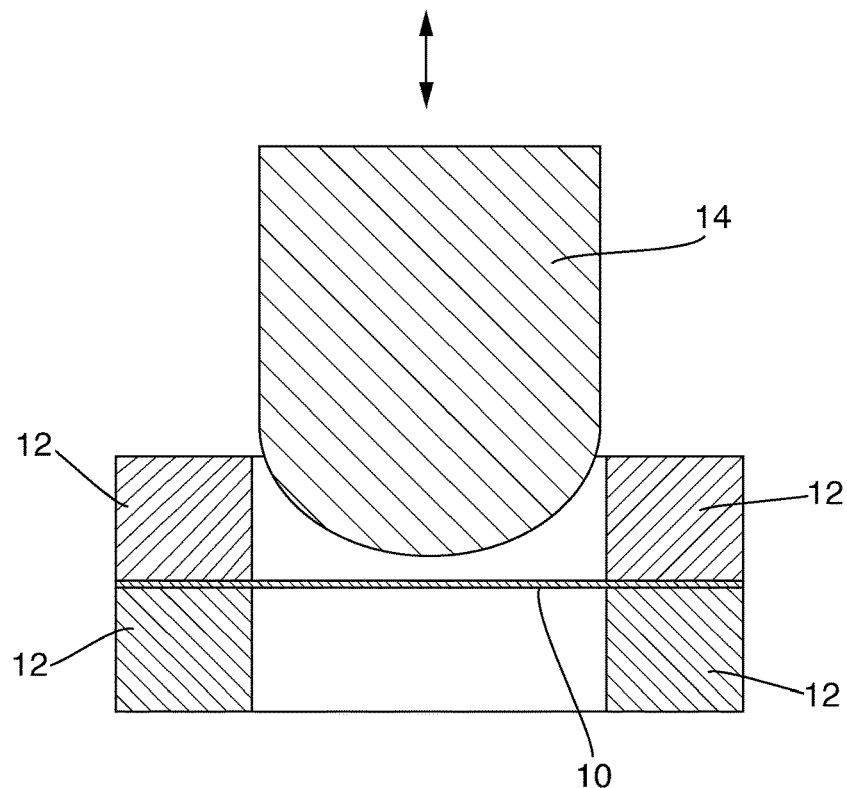
FIG. 1 is a side view of apparatus for use in a process according to the invention.

Turning to the figures, FIG. 1 shows a sheet of porous poly lactic acid 10 having a thickness of 50 μm and held between clamps 12. A male former 14 is positioned above the sheet 10 and is heated to a temperature of 100° C. The male former 14 has no vertices or sharp features and is hemispherical in shape.

The male former 14 is moved towards the sheet 10 and contacts the sheet 10. Due to the small amount of material in the sheet 10, it rapidly rises in temperature approaching 100° C. at the region of contact with the male former 14. Thus no pre heat treatment of the sheet 10 is necessary for thermoforming.

Figure 2:
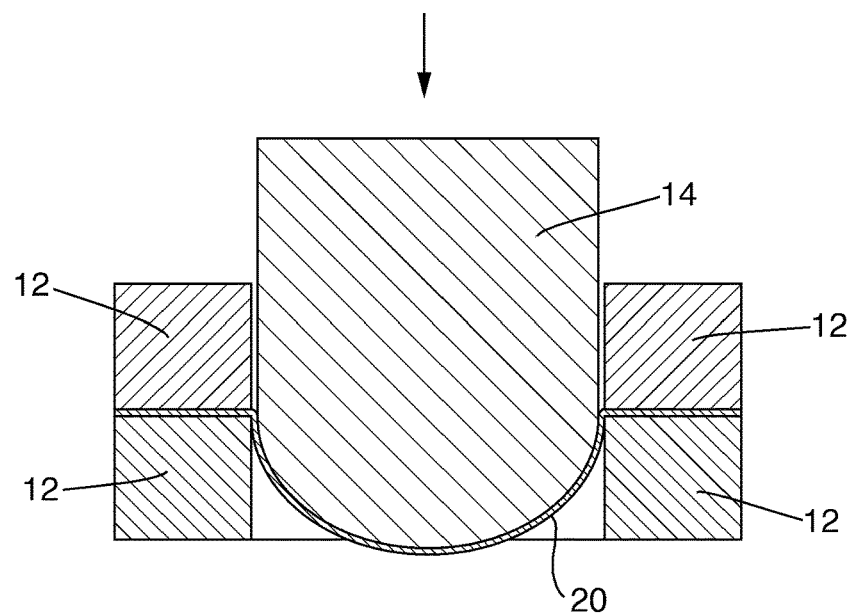
FIG. 2 is another side view of apparatus for use in a process according to the invention.
Figure 3:
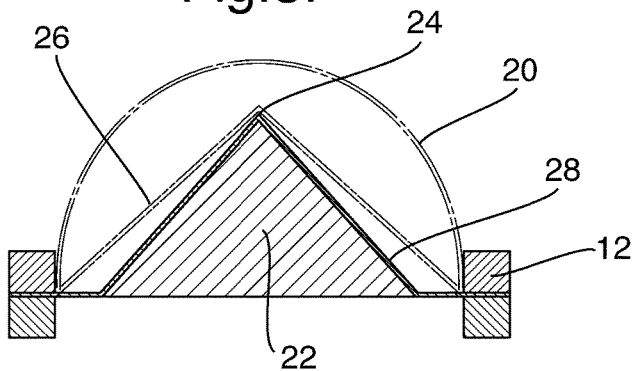
FIG. 3 is a schematic representation of a mould and formed thermoplastic according to the present invention.

The male former 14 continues to move towards the sheet 10 until it is in the position shown in FIG. 2. At this point the sheet 10 has been formed into a first formed hemispherical shape 20.

Once the first formed shape 20 has been formed, male former 14 is withdrawn and is replaced with a male former 22. The male former 22 is tetrahedral in shape with a vertex 24 formed by three sides (only one shown). The male former 22 is smaller than the first formed shape 20 and fits inside it without contact.

The first formed shape 20 is then heated by passing heated air over it at a temperature of 140° C. This has the effect of causing the first formed shape 22 to shrink back towards its original shape 10. However, in view of the placement of the male former 22, the first formed shape is prevented from doing so and instead adopts the profile of the male former 22. This forms profile 26, which closely adopts the profile of the male former 22 and importantly adopts the profile of the vertex 24. As the shape 26 was formed by shrinking, the stresses introduced in the material are greatly reduced and no failure of the material occurs.

Figure 4A:
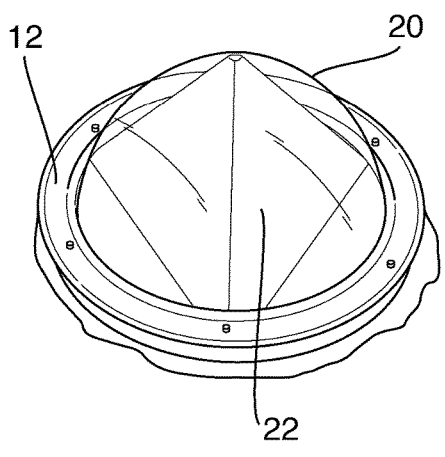
FIGS. 4a to 4c are images of a thermoplastic material being formed by a process according to the present invention.
Figure 4B:
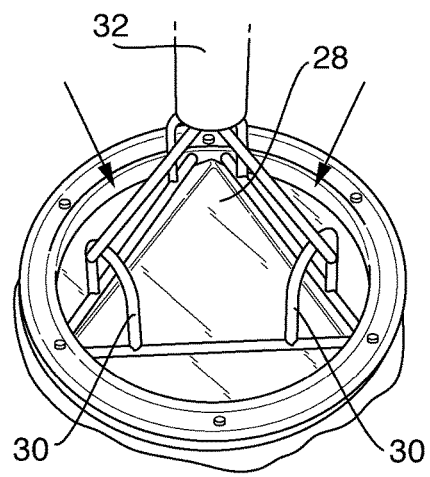
Figure 4C:
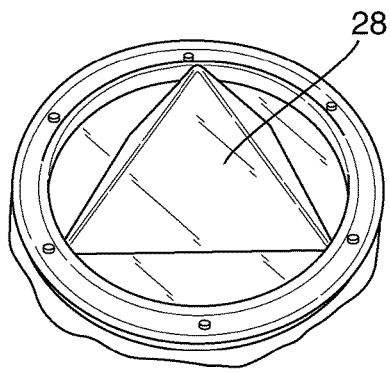

FIGS. 4a to 4c provide images of various stages of the above process. FIG. 4a shows the hemispherical first formed shape 20 with the male former 22 positioned inside it.

A further refinement of clamping the shape to more closely adopt the profile of male former 22 can be employed to result in profile 28. FIG. 4b shows the formed shape 28 being clamped in position by clamps 30. Also shown is a tube 32, from which the heated air flowed.

FIG. 4c shows the final shape 28 once the former 22 and clamps 30 have been removed. It can be seen that a tetrahedral shape having a sharp vertex has been formed in the material.

Figure 5:
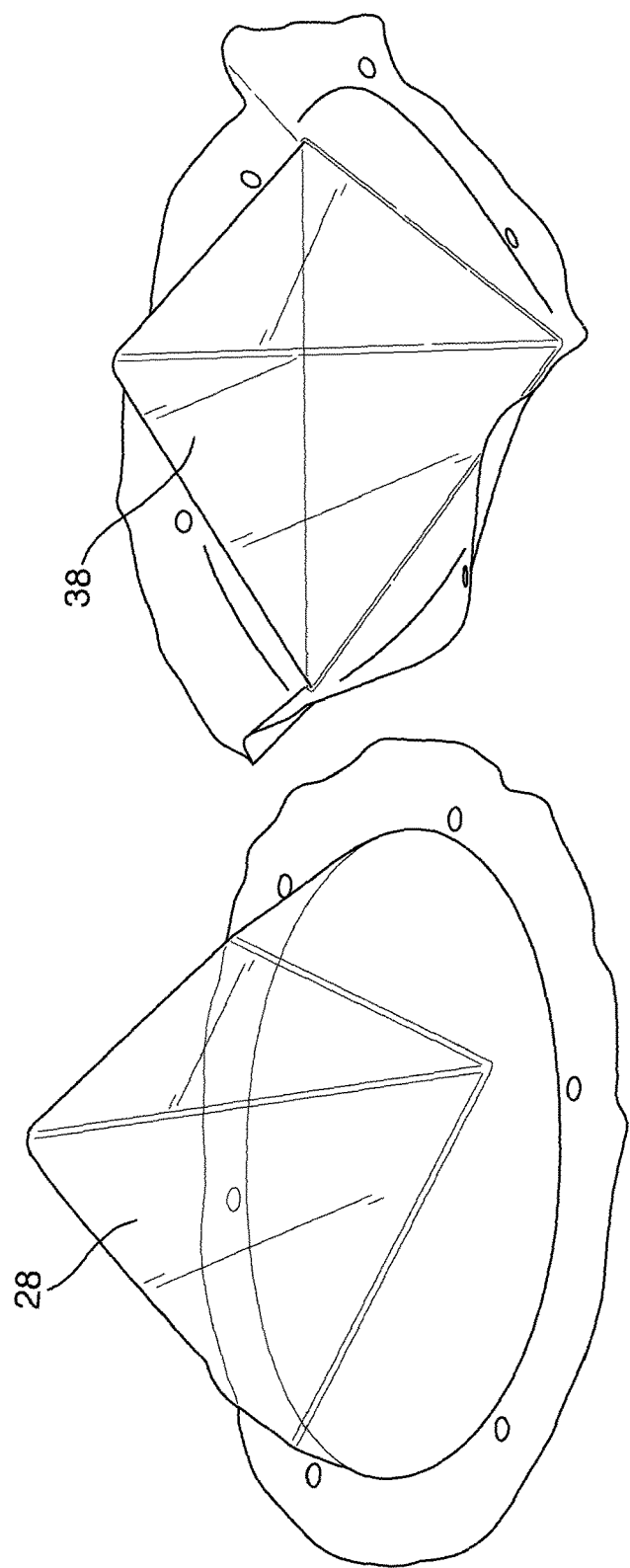
FIG. 5 is an image of a formed thermoplastic shape made by a process according to the invention.

FIG. 5 shows the final shape 28 removed from its clamps 12, together with a further image of the final shape 38 after it has been folded, ready to be filled with particulate infusion material and sealed.

The invention claimed is:

1. A process for forming an infusion packet, the process comprising the steps of:
   (i) contacting a flat sheet of porous thermoplastic material with a first, initial former having a first profile so as to impart to the sheet a first formed shape,
   (ii) positioning a second, male former within the sheet having the first formed shape, the male former having a profile comprising at least one vertex, and
   (iii) raising the temperature of the sheet having the first formed shape above a temperature at which forming step (i) is conducted, thereby causing the sheet having the first formed shape to shrink towards the male former to produce a sealable porous infusion packet having the vertex-containing profile of the male former, the porous infusion packet configured to receive infusible entities,
   wherein the flat sheet of porous thermoplastic material has an average thickness of less than 1.0 mm.

2. The process according to claim 1, wherein the flat sheet of porous thermoplastic material is gas permeable.

3. The process according to claim 2, wherein the flat sheet of porous thermoplastic material has a fabric form.

4. The process according to claim 1, wherein the initial former of step (i) is a first male former, and the male former of step (ii) is a second male former.

5. The process according to claim 1, wherein, in step (iii), said raising is conducted to a temperature of over 100° C.

6. The process according to claim 1, wherein the male former has a pyramidal shape that is tetrahedral, the pyramidal shape providing the at least one vertex.

7. The process according to claim 1, wherein the male former comprises a plurality of vertices as the at least one vertex.

8. The process according to claim 1, wherein the initial former profile is without any edges or vertices where said contacting takes place.

9. The process according to claim 1, wherein the thermoplastic material comprises poly lactic acid.

10. The process according to claim 1, further comprising depositing a particulate product of tea leaves as the infusible entities into the porous infusion packet.

11. The process according to claim 10, further comprising sealing the thermoformed material to produce a sealed porous infusion packet.

12. The process according to claim 1, wherein the flat sheet of porous thermoplastic material has an average thickness of less than 0.50 mm.

13. A process for forming an infusion packet, the process comprising the steps of:

(i) contacting a flat sheet of porous thermoplastic material with a first, initial former having a first profile so as to impart to the sheet a first formed shape, (ii) positioning a second, male former within the sheet having the first formed shape, the male former having a profile comprising at least one vertex, and (iii) raising the temperature of the sheet having the first formed shape above a temperature at which forming step (i) is conducted, thereby causing the sheet having the first formed shape to shrink towards the male former to produce a sealable porous infusion packet having the vertex-containing profile of the male former, the porous infusion packet configured to receive infusible entities, wherein the flat sheet of porous thermoplastic material has an average thickness of less than 0.2 mm.

14. The process of claim 13, wherein the flat sheet of porous thermoplastic material has an average thickness of from 0.01 to 0.1 mm.

* * * * *